United States Patent [19]

McBride

[11] 4,328,953
[45] May 11, 1982

[54] PORTABLE CYLINDER WITH MULTI-USE REMOVABLE ATTACHMENTS

[75] Inventor: Thomas D. McBride, Washington Township, Bergen County, N.J.

[73] Assignee: Joan McBride, Westwood, N.J.

[21] Appl. No.: 142,470

[22] Filed: Apr. 21, 1980

[51] Int. Cl.³ .......................................... B65H 59/00
[52] U.S. Cl. .......................................... 254/134.3 R
[58] Field of Search ............... 72/560, 393, 477, 705; 29/252, 263, 253; 254/93 R, 133, 134.3 R; 269/48.1

[56] References Cited

U.S. PATENT DOCUMENTS 2,010,713  8/1935  Countryman ..................... 72/705
3,385,087  5/1968  Huth ................................ 72/393
4,132,665  1/1979  Nelson ....................... 254/134.3 R
4,151,903  5/1979  Martino ..................... 254/134.3 R
4,271,692  6/1981  Specktor ........................... 72/705

Primary Examiner—Robert C. Watson
Attorney, Agent, or Firm—Ralph R. Roberts

[57] ABSTRACT

This invention pertains to the use of a hand-held hydraulic apparatus which uses hand operated or a small motor for actuating a hydraulic cylinder to move a piston rod to actuate particular attachments and apparatus. This apparatus includes apparatus to expand a tube; remove or insert a bearing either internally or externally; pull a wheel drum; cut lengthwise a race of a bearing; a quick-adjusting hydraulic jack; a knock-out with cutter; a shear; a press and a wheel puller.

5 Claims, 14 Drawing Figures

PORTABLE CYLINDER WITH MULTI-USE REMOVABLE ATTACHMENTS

BACKGROUND OF THE INVENTION

1. Field of the Invention

With reference to the classification of art as established in and by the United States Patent Office the present invention is believed to be found in the General Class entitled, "Metal Working" (Class 29) and the subclass entitled, "means to assemble or disassemble fluid operator" (subclass 252).

2. Description of the Prior Art

Hand held or small portable hydraulic units in which cylinders are utilized and moved or manipulated by handle means or motorized to provide pressurized hydraulic flow are well known in the prior art. A hydraulic actuated cylinder disclosing a hydraulic body repair tool for automobiles is shown in U.S. Pat. No. 2,010,713 to Countryman as issued Aug. 6, 1935. A pulling tool is shown in U.S. Pat. No. 4,091,519 as issued on May 30, 1978 to Durgan. A bearing brace and removing tool is shown in U.S. Pat. No. 2,971,254 to Fairfield as issued on Feb. 14, 1961. Hydraulic jacks with pivoted jaws are shown in U.S. Pat. No. 3,337,943 to Powell as issued on Aug. 29, 1967 and a quick acting jack is shown in U.S. Pat. No. 3,028,142 to Friesen as issued on Apr. 3, 1962. In these and other apparatus known to the applicant a hydraulic cylinder is actuated by a hand lever or a small electric motor.

In the present invention the small hydraulic cylinder is also contemplated as being actuated by a lever or a small electric motor. The piston rod of the cylinder has a threaded end on which is attached or mounted one of the several components which may be used for various jobs such as expanding tubing, inserting or withdrawing sleeves or for a quick acting jack. This cylinder may also be employed to move a hydraulic knock-out.

SUMMARY OF THE INVENTION

This may be summarized, at least in part, with reference to its objects.

It is an object of this invention to provide, and it does provide, a portable hydraulic cylinder of relatively small size and having attaching means on the end of a piston rod for removably attaching components which are actuated in response to the movement of the hydraulic cylinder.

It is a further object of this invention to provide, and it does provide, a portable hydraulic cylinder with means to move the piston and rod in response to a pressurized fluid fed to the cylinder. This rod has attaching means by which removably mounted components are moved by the rod. Among the removable components are a tube expanding device; a bearing race puller or inserter; a wheel puller; a quick acting jack; a knock-out and a cutting blade or knife; a cutter and press and a pulley for pulling or bending cable or tubing and as an anchor for lifting.

In brief, this invention provides a portable hydraulic cylinder of relatively small size and with an effective stroke of usually less than four inches. The piston rod end of this cylinder is threaded for removable attachment to components which are used to perform some desired, useful work. In one embodiment there is a sleeve or bushing puller. In another embodiment the cylinder is used to pull existing bearings or wheels. Arms are attached to the cylinder and are pivoted to provide a plurality of gripping jaws. There are alternate side arms that permit placement of the thrust pusher at a desirable position whereat the bearing is pulled. Long pivoted arms or jaw members are provided to be used with the bearing or wheel puller. A quickly adjustable hydraulic jack is also shown as well as a knife or cutter blade carried by a holder unit. A knock-out is depicted to be used with the hydraulic cylinder. An extension enabling an expander to be used is also contemplated. A pulley for pulling or bending cable and a pull press and awl for expanding holes are also shown.

In addition to the above summary the following disclosure is detailed to insure adequacy and aid in understanding of the invention. This disclosure, however, is not intended to cover each new inventive concept no matter how it may later be disguised by variations in form or additions of further improvements. For this reason there has been chosen specific embodiments of a portable hydraulic cylinder as adopted for use with removable components and showing a preferred means for the attachments to a piston rod. This specific embodiment has been chosen for the purposes of illustration and description as shown in the accompanying drawings wherein:

BRIEF DESCRIPTION OF THE DRAWINGS

In the following description and in the claims various details are identified by specific names for convenience. These names are intended to be generic in their application. Corresponding reference characters refer to like members throughout the several figures of the drawings.

The drawings accompanying, and forming part of, this specification disclose details of construction for the purpose of explanation but structural details may be modified without departure from the concept and principles of the invention and the invention may be incorporated in other structural forms than shown.

Figure 1:
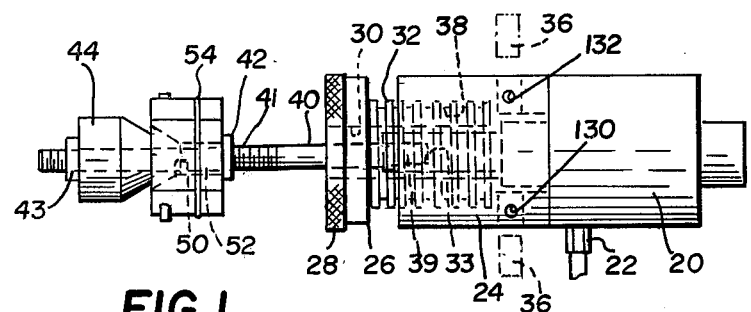
FIG. 1 represents a side view, partly in section, and showing a hydraulic cylinder adapted for pulling a bushing or sleeve and then withdrawing the sleeve and/or bushing from a retainer.

Sleeve or Bushing Puller of FIG. 1

Referring to the drawings and to the several attachments to be used with a small hydraulic cylinder, said cylinder is conventionally a hand actuated unit or may be a small cylinder actuated by an electric motor. As shown, a cylinder 20 is moved by fluid fed in and through a conductor 22. A spring return may be provided in the cylinder or another conductor, not shown, may be used. The cylinder has collar portions 23 to which is removably attached a receiving member 24. Set screws are normally used to secure this receiving member 24 to the collar member but other means may be employed such as clamp screws 25 which grip the collar portion of the cylinder. This receiving member 24 may be removably secured by like pins 36 which are slidable in holes formed in receiving member 24 and enter into shallow blind holes formed in the housing of cylinder 20. Whatever the mounting means the receiving member 24 is mounted on the cylinder 20 during the pulling of the sleeve or bushing.

There is depicted a stop 26 having a resilient or nonmar face member 28. The stop 26 and face member 28 have a through aperture 30. The stop 26 has a threaded portion 32 which is mounted in a compatibly threaded portion 33 in a receiving member 24. A piston rod 38 has an internal thread 39 in which is removably mounted a pull rod 40. This rod is formed with threads 41 on which are mounted nuts 42 and 43. A tapered expanding wedge 44 is slidably mounted on this rod.

Figure 2:
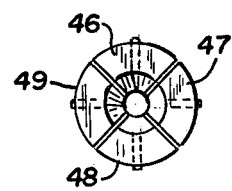
FIG. 2 represents an end view, partly diagrammatic, and showing the puller of FIG. 1.
Figure 3:
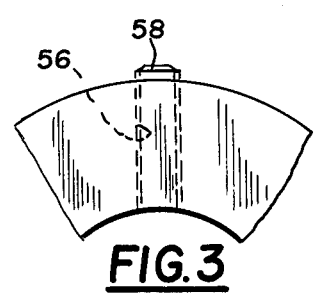
FIG. 3 represents, in an enlarged scale, an end view of a typical expander segment as seen in FIG. 2, this view showing the mounting and manipulation of a set screw carried in each segment.

Puller of FIGS. 1, 2 and 3

In FIGS. 1, 2 and 3 there is shown the expanding bearing or bushing puller. Four segments 46, 47, 48 and 49 are shown and are alike or reasonably similar. The segments may be as few as three and of course may be more than four. The segments have a conical taper 50 which terminates at a through passageway 52 through which the shaft 40 is free to move. A resilient rubber band or spring 54 holds the multiplicity of segments 46, 47, 48 and 49 together. As shown in FIG. 3, each of these segments has a threaded and radially disposed hole 56 in which is mounted a hardened hollow headed set screw 58. These screws are rotated to protrude a desired amount beyond the outer surface of the segment.

Use and Operation of Apparatus of FIGS. 1, 2 and 3

In use, the bearing or sleeve puller is mounted to the cylinder 20 as shown in FIG. 1. The segments 46, 47, 48 and 49 are in the inner condition of FIG. 1. The stop 26 and attached face member 28 are brought against the face of the housing in which the bushing or bearing to be removed is mounted. The cylinder 20 is actuated to move the piston rod 38 and the wedge 44 to the right. As the wedge engages the conical taper 50 the wedges are urged outwardly causing the outer ends of the set screws 58 to penetrate the bushing or sleeve. With the ends of the screws 58 sunk into the sleeve or bushing the further movement of the cylinder enables the bushing or sleeve to be displaced from its mounted condition. Adjustment is provided by the threaded portion 32 and the compatible portion 33 in member 24. The expander can be moved outwardly for a larger hole. Insertion and/or mounting of a sleeve or bushing by disclosed apparatus will be made by other attachments later described.

Figure 4:
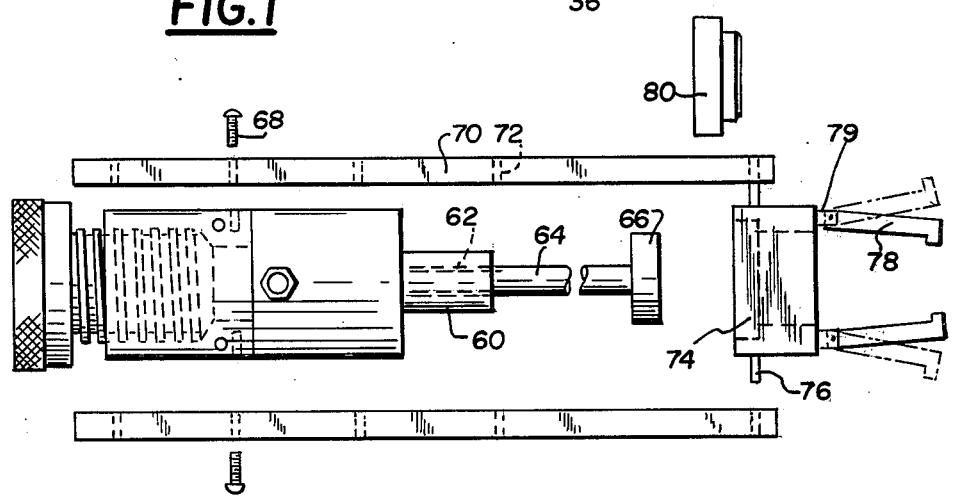
FIG. 4 represents a side view, partly diagrammatic, and showing the relationship of the hydraulic cylinder and attachment for providing a bearing puller or press.

Press Embodiment of FIG. 4

Referring next to FIG. 4 and the attachments that are used with the basic portable hydraulic cylinder, said cylinder is now arranged as in FIG. 1, discussed above. This hydraulic cylinder 20 is now used as a pushing apparatus. The piston has a right rod end 60 having an internal thread 62 in which is mounted rod 64. On the right end of this rod is removably mounted an anvil head 66. To the body of the cylinder 20 is pivotally secured, as by pins 68, extension arms or members 70. These arms are formed with spaced apertures 72 which are sized to maintain pins 68 in slidable engagement. The right end of arms 70 are removably mounted on a support block 74. The block 74 is maintained in the arms 70 by pins 76 which allow a pivotal support of said block. There is also shown jaw members 78 which are pivotally mounted in ear ends 79 on this block by pins 76.

Use and Operation of Apparatus of FIG. 4

The apparatus of FIG. 4 is used to install a sleeve or bushing in a housing, not shown. The cylinder 20 is used with a rod 64 mounted in the rightwardly moved piston rod end. The anvil head 66 is selected as and of a size to engage the end of a bushing or liner to be installed. The block 74 engages the body of the member into which the bushing or liner is to be mounted. The arms 70 are arranged so that the pins 68 mount in the desired apertures 72. With the bushing or sleeve in place in the housing the anvil 64 is moved forwardly by manipulation and actuation of the cylinder. The jaw members 78 are turned inwardly or outwardly as needed to engage the flange or member and actuation of the cylinder is made. In a like manner the jaw members 78 may be used as shown with the forward (rightward) movement of the anvil head 66 to use the forward movement of the anvil head to pull or draw a wheel or flange by the application of thrust on the anvil head. A loose plate 80 may be used with block 74 to provide an integral support means.

Figure 5:
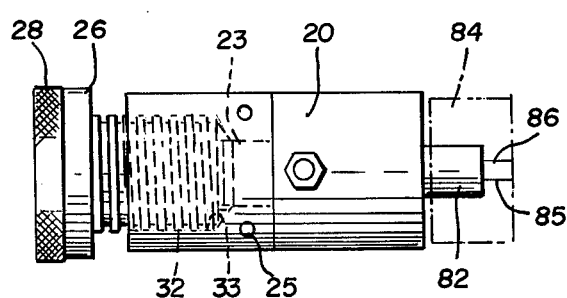
FIG. 5 represents a side view of an alternate use of the hydraulic cylinder and attachments adopted to provide a quickly adjustable hydraulic jack.

Quickly Adjustable Jack of FIG. 5

Referring next to FIG. 5, the cylinder 20 is arranged to provide a quickly adjustable jack. The jack includes the stop 26, the resilient face member 28 and also the compatible threaded portion 33 which is turned into threaded end 32. This cylinder also has on its right end a rod which is moved by the piston of the cylinder. This right end 82 is seated in a foot member 84 which may be circular or may have a flange portion providing a greater foot extent. This foot member 84 has a seating shoulder 85 and a pilot hole 86 into which the reduced seating shoulder 85 of the right end 82 of the piston rod is shown as secured. The pilot 85 may be eliminated in certain embodiments.

Operation of the Quickly Adjustable Jack of FIG. 5

In operation the jack assembly of FIG. 5 uses the hydraulic cylinder 20 as shown in FIGS. 1 and 4. The right end includes the resilient face 28 and the stop 26 with the compatible threaded portion 33. This left portion or assembly is rapidly adjusted for, as example, a distance of two inches. The cylinder is actuated by a hand pump or electric motor to cause the right end and the mounted foot member 84 to be moved by the piston. The lift extent is governed by the movement of the piston.

Figure 6:
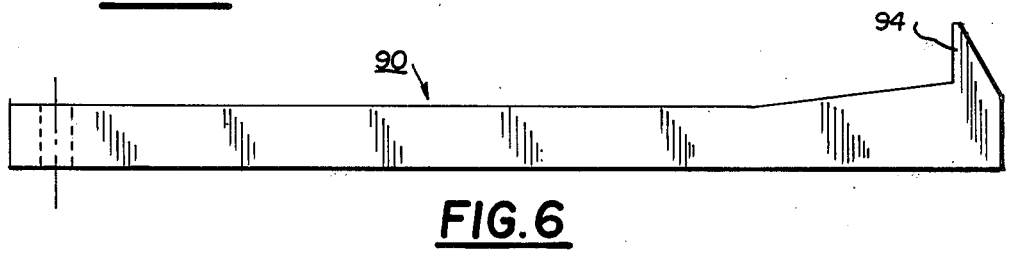
FIGS. 6 and 7 represent side and edge views of long reinforced jaw members for use with the apparatus of FIG. 4.
Figure 7:
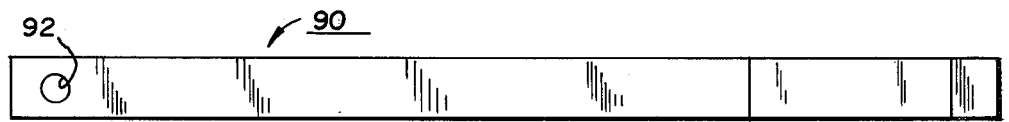

Jaw Member Embodiment of FIGS. 6 and 7

FIGS. 6 and 7 depict longer reinforced jaw members. The representation is of at least a pair of like sized and shaped jaw members generally identified as 90. At and in the left end of these members is formed a hole 92. This hole is a swinging fit on the pins 68 as seen in FIG. 4. The right end of these jaw members are reinforced to include and strengthen the out-turned leg portion 94.

Use and Operation of Jaws of FIGS. 6 and 7

The long jaw members 90 are used at least in like pairs but may include three or more like jaw members. Pins 68 are used to pivotally secure these jaw members 90 through holes 92 onto hydraulic cylinder 20. When the jaws 90 are mounted in place the jaw members are not only retained by pins 68 but swing a little from a defined line since the pin is a rather sloppy fit in hole 92. The out-turned leg portion 94 can be turned inwardly or outwardly as desired or required.

Figure 8:
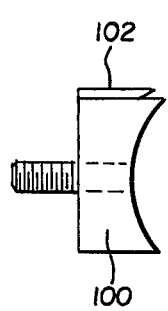
FIG. 8 represents a side view and showing a knock-out body with a hook knife which provides means for the cutting of a sleeve or bushing.
Figure 9:
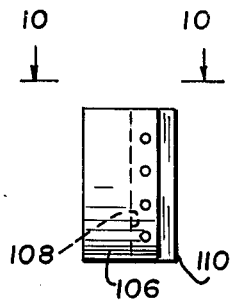
FIG. 9 represents a side view of an alternate cutting head.
Figure 10:
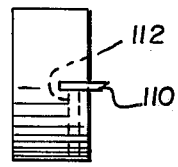
FIG. 10 represents a view of the cutting head of FIG. 9, this view taken at about ninety degrees from that of FIG. 9 and taken on the line 10—10 and looking in the direction of the arrows.

Cutter as in FIGS. 8, 9 and 10

The hydraulic cylinder 20 is also used to power apparatus which, as shown in FIG. 8, may be a knock-out die 100 for a large hole in an electrical box or enclosure. In operation the knock-out dies are often used with an attached knife or cutting member 102. The die 100 as depicted has a knife portion 102 attached to the outer surface of the knock-out.

The cutting member 102 projects from the knock-out body 100 and is used to cut an exterior or interior sleeve without the destruction of the member on which it is mounted. This cutting member 102 is moved along and guided to cut only one of the sleeves. The body 100 insures that the cutting member does not penetrate that sleeve or bushing body to be left intact. This cutter 102 is particularly useful in the separating of tubular assemblies in muffler systems and in certain hydraulic systems in which two tubular members are arranged in an overlapped condition.

In FIGS. 9 and 10, a body 106 has a slot 108 which may be across the face of the body. A cutter blade 110 is mounted in this slot. Set screws 112 may be used to secure the blade in this slot.

Use and Operation of Cutters of FIGS. 8, 9 and 10

In use it is contemplated that the knock-out 100 with cutting member 102 is mounted on the hydraulic cylinder 20. The body portion of the knock-out is drawn forwardly by the actuation of the cylinder 20. The cutter blade 102 is drawn into engagement with the sleeve or bushing to be cut and is then drawn forwardly to effect the cutting action. With the cutting assembly of FIGS. 9 and 10, the cutter blade 110 is as long as desired or required. This blade may only engage the sleeve or bushing to be cut at one edge or may be long enough to make diametrical cuts. The body 106 may be of a selected diameter and the blade 110 may be adjusted to a selected extension beyond the body 106.

It is also contemplated that the body 106 and cutter blade 110 may be used with the apparatus of FIG. 4. The body 106 is mounted on the end of the rod 64. The arms are positioned on the cylinder 20 and the body 106 with blade 110 is now moved forwardly toward the support block 74. A cable or similar member, not shown, can then be cut by hydraulic actuation. This apparatus may be employed to move a hydraulic cylinder to propel a knock-out with or without a cutter blade by which a sleeve is longitudinally cut. This same cylinder may be used to move a body carrying a knife blade by which a tubing can be cut longitudinally or as a transverse knife can be disposed with a retaining body to cut a pipe or cable by a propulsion of said blade toward this retaining or support body.

Figure 11:
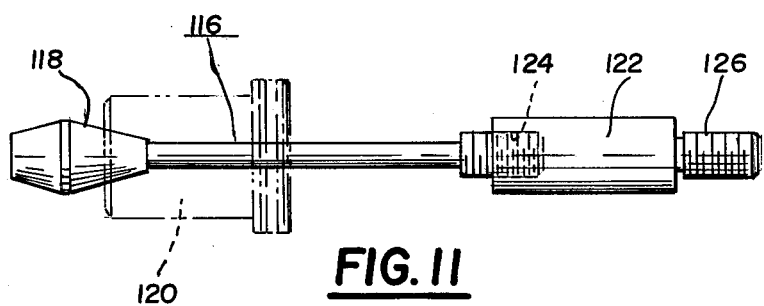
FIG. 11 represents a side view, partly diagrammatic, and showing a tubular expanding apparatus that may also be used with an auxiliary connector to connect a hydraulic cylinder to existing expanding apparatus.

Attachment for Expander as in FIG. 11

Referring next to the attachment of FIG. 11, there is shown a tapered plug member 116 which has a tapered end 118 which engages and expands a segmented expander 120 of known design. These expanding apparatus are well known and are extensively used for sizing tubing in mufflers and the like. These expanding elements are tapered with either conical configurations or with inwardly sloped surfaces. The tapered plug member 116 is made to suit the type of expander used. What is provided with this assembly is a coupling member 122 which has a receiving threaded hole 124 at one end and a threaded end 126 at the other end. This male end is fitted into the threaded receiving left end of the piston rod of the cylinder 20 of FIG. 1.

This coupling member 122 enables the hydraulic cylinder 20 of FIG. 1 to be used with a conventional expander set. The coupling 122 is replaced when abuse occurs or a longer coupling or remote usage is desired. Any of the expanding systems can be employed and with a sleeve or spacer not shown the apparatus of this invention can be used with tubing expanding apparatus.

The cylinder 20 is also used with a swaging tool such as in Huth (U.S. Pat. No. 3,385,087) and in other swaging tools used as sizing tools. These prior known tools have been and are actuated by a bench type (fixed) hydraulic cylinder. In the present invention the portable cylinder 20 is altered sufficiently to include means to mount the receiving member 24 (FIG. 1) which includes a female threaded portion 33 compatable with threaded portion 32. Set screws 130 and 132 clamp and affix this receiving member 24 to the portable cylinder 20. The stop 26 and the associated face member 28 is adjusted in and out so that tapered plug member 116 can and is used to move a conventional expanding segment assembly 120 to the desired position and condition.

The adjustment of stop member 26 and the face member 28 is provided as threaded portion 32 is rotated in compatible threaded portion 33 of receiver 24. This assembly achieves infinite adjustment in the use of the segmented expander 120.

Figure 12:
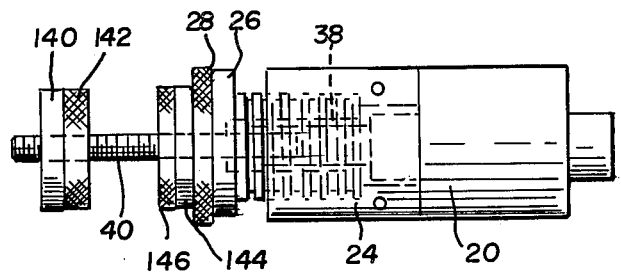
FIG. 12 represents a side view of a portable cylinder employing a portion of the apparatus of FIG. 1 with a threaded end and a threaded pull disk and a slidable disk and providing a pull press assembly.

Pull Press as Provided in FIG. 12

There is depicted in FIG. 12 the cylinder 20 and the receiving member 24 in mounted condition. The stop 26 and the face member 28 are also shown. Pull rod 40 is mounted in the threaded portion of the piston rod 38.

As a pull press there is also provided a threaded disk 140 which is depicted as having a resilient face portion 142. If needed, a like disk 144 and face member 146 can be provided. This inner disk 144 and face member 146 are slidable on the pull rod 40. The stop 26 is adjusted to provide a desired stop inner limit.

Use and Operation

This pull press employs the hydraulic cylinder and receiving member 24. The stop 26 is mounted in the receiving member 24 and if needed an inner disk 144 may be placed next to the stop 26. Rod 40 is mounted in the piston rod as in FIG. 1 or as in FIG. 12. The housing and the sleeve or bearing to be assembled is now brought to and on the rod 40 and the threaded disk 140 is mounted on this distal threaded end of the rod. The disk 140 is rotated to bring said disk into engagement with the face of one of the members to be pressed together. The cylinder 20 is now actuated to pull the rod toward the cylinder to draw the two or more pieces together in the desired assembly.

Figure 13:
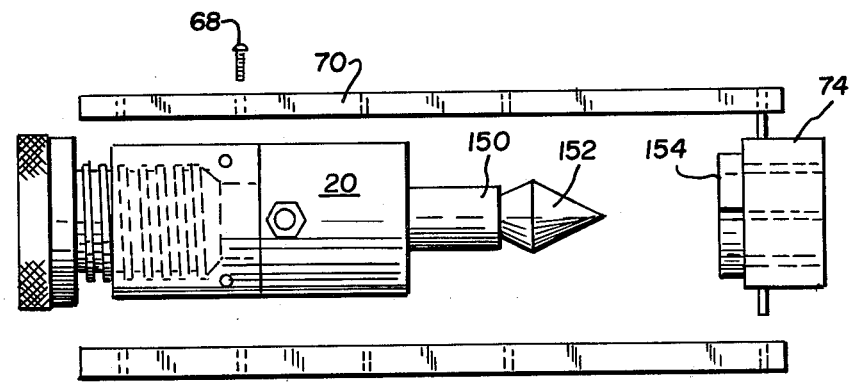
FIG. 13 represents a side view, partly diagrammatic, and showing the apparatus of FIG. 4 used with additional attachments to expand and form small holes in light metal.

Small Hole Expander as in FIG. 13

Referring next to FIG. 13, it is to be noted that the apparatus of FIG. 4 is utilized for expanding small holes which have been previously provided in light metal members, such as lugs, tin covers, etc. Rather than the push rod 64 and anvil head 66 there is mounted a receiver 150. This receiver is shaped to receive an end of an awl 152. This awl is tapered toward both ends with the middle providing the desired diameter. An apertured disk support 154 is mountable in support block 74.

Use and Operation

The apparatus utilizing the hydraulic cylinder 20 and the threaded receiver 150 enables the awl 152 to be placed in position with the sharp end toward the hole in the disk support 154. The piston rod 38 and receiver 150 are moved toward the support block 74. The awl 152 is urged through the hole to be expanded and then into the aperture in disk support 154. When the largest diameter of the awl has passed through the hole being sized the diminished taper allows the easy removal of the awl.

Figure 14:
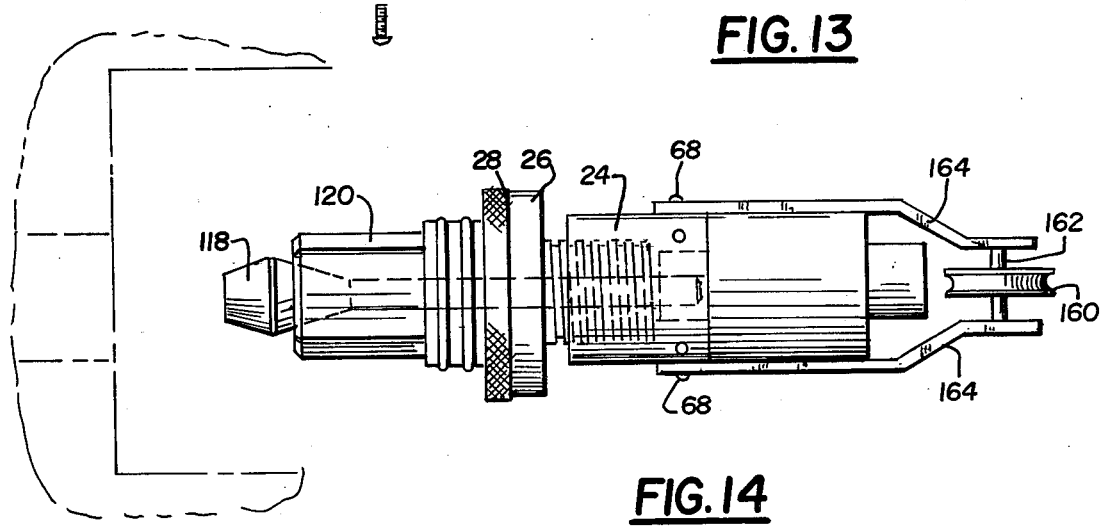
FIG. 14 represents a side view of the expander apparatus of FIG. 11 with the cylinder retainer also carrying arms and a pulley for bending or pulling cable.

Cable Puller or Bender as in FIG. 14

Referring next and finally to FIG. 14, there is depicted the tubing expander of FIG. 11 with a pulley support carried by receiving member 24. As shown there is a pulley 160 which is rotatable on shaft or axle 162. Side supports 164 are removably secured to the receiver 24 by pins 68 previously identified.

Use and Operation

It is often desirable or necessary to bend or pull pipe or cable at or on the job. This cable or pipe may be installed or partly installed and in a tight, nearly inaccessible position or compartment. The expander of FIG. 11 is employed and the segmented expander assembly 120 is inserted into an available hole in the wall, ceiling, floor or conduit box. The expander set is moved outwardly, as for tube sizing, and the expanded segments tightly engage a hole to provide a desired support for a pulley. After use as a pipe or cable bender or as a pulley the expander is collapsed and the attachment assembly of FIG. 14 is removed with no damage to the hole. This pulley assembly may be used to lift heavy loads, as by a pulley. Cable and/or pipe may be pulled or bent around the pulley 160.

Of particular note and importance is the receiving member 24 which is removably secured to the housing of the cylinder 20. This receiving member not only has a through passageway for the free movement of a piston rod or coupling but also has a coarse threaded portion 33 which is compatible with threaded portion 32. This receiving member 24 is secured to the cylinder 20 and provides attaching means for the several attachments that are used with the cylinder. The securing of the receiving member to the cylinder may be by clamp screws 130 or 132 or by pins 36 or other means. When secured this receiving member is immobile as to rotational and/or longitudinal movement.

It is also to be noted that the coupling 122 in and of FIG. 11 is made with a determined length to allow a portable hydraulic cylinder to be used with existing and known expander units commercially available. The threaded end 126 is secured in the threads of the piston rod and this coupling is used to draw the tapered end portion 118 to the right a determined amount and limit to expand the tubing in and by conventional expander means, such as Huth above noted.

Terms such as "left", "right", "up", "down", "bottom", "top", "front", "back", "in", "out" and the like are applicable to the embodiments shown and described in conjunction with the drawings. These terms are merely for the purposes of description and do not necessarily apply to the position in which the portable hydraulic cylinder and attachments may be constructed or used.

While a particular embodiment of the attachments have been shown and described it is to be understood the invention is not limited thereto since modifications may be made within the scope of the accompanying claims and protestion is sought to the broadest extent the prior art allows.

What is claimed is:

1. A portable hydraulic cylinder operable by use of a hand held pump apparatus or a small motor, said cylinder including a piston and rod which is moved by pressurized fluid to an inner and outer limit with selective input and output of pressurized fluid, said cylinder having its outer body contoured so as to removably retain in a fixed attitude and position an attachment apparatus that utilizes forces developed by the movement of said piston rod, the removable attachment apparatus to the body of the cylinder including:

(a) at least one pressurized fluid conductor operably connected to one end of the cylinder when and while the removable attachment apparatus is mounted to the cylinder body and is used therewith, said conductor carrying the pressurized fluid to and from the cylinder;

(b) means for securing said removable attachment apparatus to said cylinder body, and when and while secured in a fixed relationship to said cylinder body the attachment apparatus does not interfere with the actuation of the piston and rod, said attachment apparatus having an aperture therethrough so that said removable attachment apparatus is disposed to enclose said rod;

(c) means for removably attaching a pull rod and an attached expander wedge to the extending end of the piston rod, said pull rod and attached expander wedge moved towards and away from the cylinder by the movement of the piston;

(d) a pair of side supports removably secured to said removable attachment apparatus when and while secured to said cylinder body, said side supports disposed to lie adjacent to said removable attachment apparatus with the distal ends of the side supports retaining an axle on which there is mounted a freely rotatable pulley grooved to receive tubing, cable, rope and the like, and in said removable attachment apparatus there is provided adjustable receiving means;

(e) a stop shoulder means carried by the adjustable receiving means in the removable attachment apparatus, this stop shoulder disposed to permit the pull rod to be freely movable therein and therethrough; and (f) an expander segment grouping disposed to be expanded when moved against said stop shoulder, the expander grouping exteriorly sized to be inserted into a hole of determined size and with the continued movement of the expander wedge towards the cylinder to provide expansion of the expanding segments, said expanded segments becoming securely mounted in the selected hole and after the expander grouping is expanded the side supports carrying the rotatable pulley are secured and available for pulling and bending cable, tubing, rope and the like and also are available as a pulley for lifting.

2. A portable cylinder attachment as in claim 1 in which the side supports are removably attached to the attachment apparatus as by pins and the side supports are bent at one distal end to provide a narrower extent between the pair of supports so that the retained axle may be made as a short member.

3. A portable cylinder attachment as in claim 2 in which the stop shoulder means is carried in the removable attachment as by threads formed in the removable attachment and threads formed on the stop shoulder means, said threads being compatibly formed to provide toward and away movement of the stop shoulder from the piston.

4. A portable cylinder attachment as in claim 3 in which the pull rod is mounted in the piston rod by means of the thread formed in the extending end of the piston rod.

5. A portable cylinder attachment as in claim 1 in which the removable attachment apparatus is a split collar apparatus and the screws carried in the attachment apparatus are tightened to secure said attachment apparatus to a collar portion of the cylinder.

* * * * *